US012646200B2

(12) United States Patent
Chiba et al.

(10) Patent No.: US 12,646,200 B2
(45) Date of Patent: Jun. 2, 2026

(54) SYSTEM AND METHOD FOR SUPPORTING MOVING BODY

(71) Applicant: TOYOTA JIDOSHA KABUSHIKI KAISHA, Toyota (JP)

(72) Inventors: Hiroya Chiba, Fuji (JP); Koji Morita, Gotemba (JP); Yuhei Oka, Susono (JP); Daisuke Kakuma, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 18/374,017

(22) Filed: Sep. 28, 2023

(65) Prior Publication Data

US 2024/0119621 A1 Apr. 11, 2024

(30) Foreign Application Priority Data

Oct. 7, 2022 (JP) ................................. 2022-162256

(51) Int. Cl.
*G06T 7/70* (2017.01)
*G06T 7/80* (2017.01)
(Continued)

(52) U.S. Cl.
CPC .................. *G06T 7/70* (2017.01); *G06T 7/80* (2017.01); *G06V 20/54* (2022.01); *G08G 1/096725* (2013.01); *G06T 2207/30204* (2013.01); *G06T 2207/30232* (2013.01); *G06T 2207/30244* (2013.01); *G06V 2201/08* (2022.01)

(58) Field of Classification Search
CPC ... G06T 7/70; G06T 7/80; G06T 2207/30204; G06T 2207/30232; G06T 2207/30244; G06V 20/54; G06V 2201/08; G08G 1/096725
See application file for complete search history.

(56) References Cited

U.S. PATENT DOCUMENTS

| | | | | |
|---|---|---|---|---|
| 11,025,865 B1 * | 6/2021 | Medasani | .............. | H04N 7/181 |
| 2011/0122257 A1 | 5/2011 | Kirk | | |
| 2022/0392345 A1 * | 12/2022 | Wada | .................... | H04W 4/023 |

FOREIGN PATENT DOCUMENTS

| | | |
|---|---|---|
| JP | 2008-015573 A | 1/2008 |
| JP | 2011-076573 A | 4/2011 |

(Continued)

*Primary Examiner* — Ming Y Hon
*Assistant Examiner* — Amanda H Pearson
(74) *Attorney, Agent, or Firm* — Dinsmore & Shohl LLP

(57) ABSTRACT

The present disclosure provides a system for supporting a movement of a moving body in a predetermined area. The system acquires an image captured by an infrastructure camera such that the image includes a plurality of markers arranged in the predetermined area. The system compares the image acquired this time and the image acquired previous time. The system detects a position change marker among the plurality of markers whose position in the image acquired previous time changes from that in the image acquired this time. The system determines that the infrastructure camera is out of position when it is detected that number of the position change marker is equal to or more than a predetermined number. The system determines that the infrastructure camera is not out of position when it is detected that number of the position change marker is less than the predetermined number.

8 Claims, 6 Drawing Sheets

(51) Int. Cl.
    *G06V 20/54*        (2022.01)
    *G08G 1/0967*     (2006.01)

(56)           References Cited

FOREIGN PATENT DOCUMENTS

| JP | 2014-209686 A | | 11/2014 |
|----|---------------|---|---------|
| JP | 2021-117816 A | | 8/2021 |
| JP | 2022-018583 A | | 1/2022 |
| JP | 2022100957 A | * | 7/2022 |

* cited by examiner

100 : MOVING BODY SUPPORT SYSTEM

SYSTEM AND METHOD FOR SUPPORTING MOVING BODY

CROSS-REFERENCE TO RELATED APPLICATION

The present application claims priority under 35 U.S.C. § 119 to Japanese Patent Application No. 2022-162256, filed Oct. 7, 2022, the contents of which application are incorporated herein by reference in their entirety.

BACKGROUND

Field

The present disclosure relates to a system and a method for supporting moving body.

Background Art

JP2008-015573A discloses an image processing apparatus for good determination of presence of a moving object region in which a moving object is present. According to the technique, the moving object region is detected from each of a plurality of camera images and is converted into the moving object region in a designated plane coordinate system. Then, overlap of the respective moving object regions is detected, and the presence of the moving object region in the real space is determined based on the result of the detection of the overlap.

SUMMARY

A technique for estimating a position of a moving body using an image captured by an infrastructure camera. The result of the position estimation can be used for, for example, control of the moving body. However, at this time, if the camera becomes out of position, there is a possibility that an error occurs in the position estimation, and the control of the moving body cannot be performed correctly. Therefore, when the camera is out of position, it is required to accurately detect the positional displacement before or at the time of control. An object of the present disclosure is to provide a technique capable of accurately detecting a positional displacement of the infrastructure camera.

The first aspect of the present disclosure relates to a system for supporting a movement of a moving body in a predetermined area. The system comprises one or more processors. The one or more processors are configured to:

acquire an image captured by an infrastructure camera such that the image includes a plurality of markers arranged in the predetermined area;

compare the image acquired this time and the image acquired previous time;

detect a position change marker among the plurality of markers whose position in the image acquired previous time changes from that in the image acquired this time;

determine that the infrastructure camera is out of position when it is detected that number of the position change marker is equal to or more than a predetermined number; and determine that the infrastructure camera is not out of position when it is detected that number of the position change marker is less than the predetermined number.

The second aspect of the present disclosure relates to a method for supporting a movement of a moving body in a predetermined area. The method includes the steps of:

acquiring an image captured by an infrastructure camera such that the image includes a plurality of markers arranged in the predetermined area;

comparing the image acquired this time and the image acquired previous time;

detecting a position change marker among the plurality of markers whose position in the image acquired previous time changes from that in the image acquired this time;

determining that the infrastructure camera is out of position when it is detected that number of the position change marker is equal to or more than a predetermined number; and determining that the infrastructure camera is not out of position when it is detected that number of the position change marker is less than the predetermined number.

The third aspect of the present disclosure relates to a system for supporting a movement of a moving body in a predetermined area. The system comprises one or more processors. The one or more processors are configured to:

acquire an image captured by infrastructure cameras installed in the predetermined area, wherein the infrastructure cameras include a first infrastructure camera and a second infrastructure camera that are configured to capture a same marker from different positions;

detect a first change of a position of the same marker by comparing a first image acquired this time with the first image acquired previous time, the first images are captured by the first camera, detect a second change of a position of the same marker by comparing a second image acquired this time with the second image acquired previous time, the second images are captured by the second camera, determine that the first infrastructure camera is out of position when the first change is detected whereas the second change is not detected.

According to the aspects of the present disclosure, it is possible to accurately detect a positional displacement of an infrastructure camera.

DETAILED DESCRIPTION

Embodiments of the present disclosure will be described with reference to the accompanying drawings.

1. Overview

Consider a control device that controls a moving body in a predetermined area in which a marker is arranged. The predetermined area is exemplified by a parking lot. The parking facility may be an AVP parking facility. Examples of the moving body include a vehicle and a robot. As an example, a case where the moving body is a vehicle will be considered in the following description.

Figure 1:
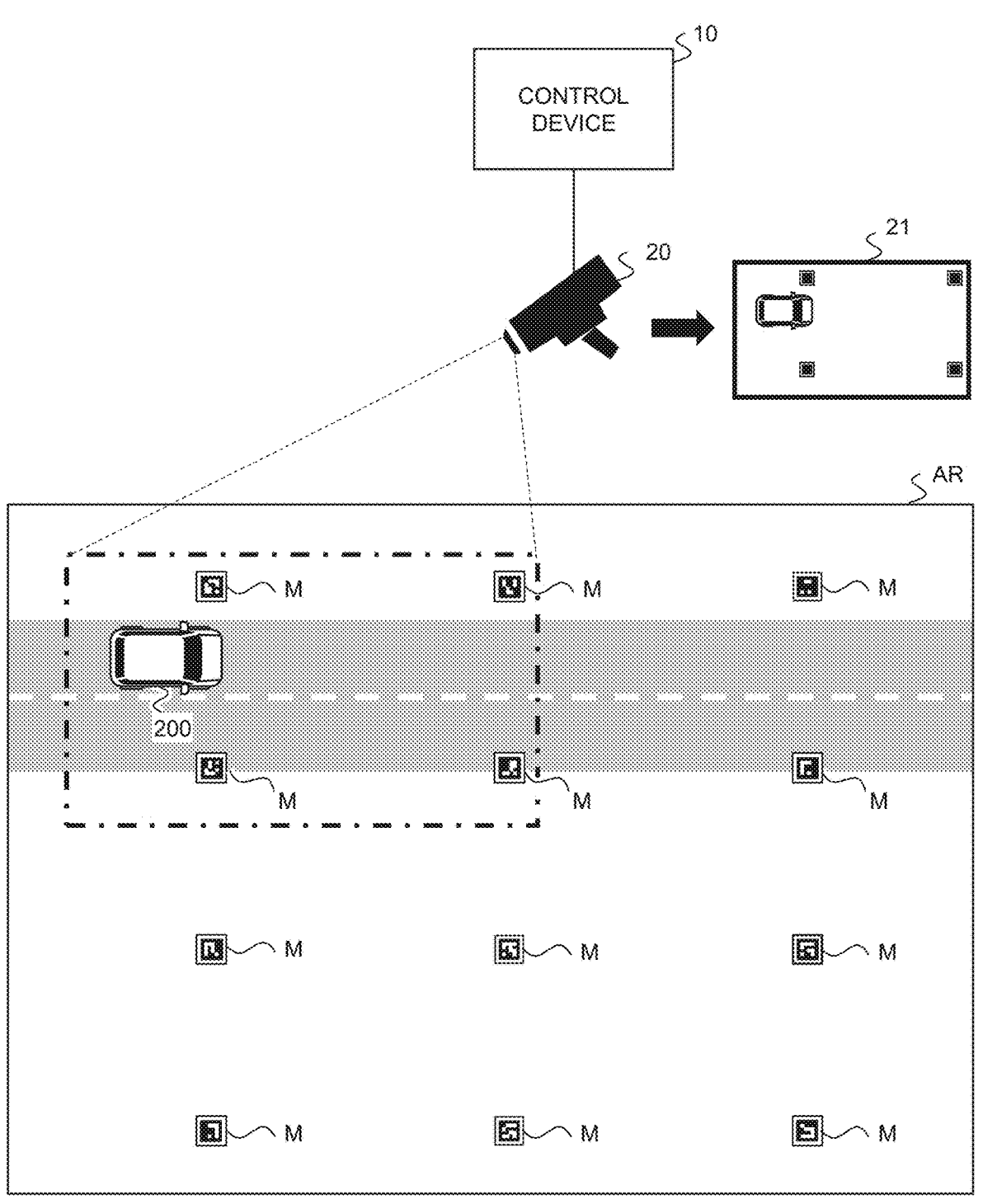
FIG. 1 is a diagram for explaining an outline of a first embodiment.

FIG. 1 shows an example of the predetermined area AR. A marker M is arranged in the predetermined area AR. The marker M is a mark having information on a position in the predetermined area AR. The camera 20 is an infrastructure camera installed in an infrastructure, and captures an image in the predetermined area AR so as to include the marker M. In FIG. 1, a range imaged by the camera 20 is indicated by an alternate long and short dash line. The control device 10 acquires the image 21 captured by the camera 20 and estimates the position of the vehicle 200 based on at least the image 21. Further, the control device 10 can control the movement of the vehicle 200 in the predetermined area AR based on the estimated position of the vehicle 200.

In a case where the result of the position estimation using the image 21 obtained from the infrastructure camera 20 is used as described above, if the position of the camera 20 is shifted, there is a possibility that an error occurs in the position estimation and the vehicle 200 cannot be correctly controlled. Therefore, it is required to accurately detect the positional deviation of the camera 20 before or at the time of controlling the vehicle 200.

Therefore, the first embodiment provides a technique capable of accurately detecting the positional deviation of the camera 20. A marker M is used to detect the positional deviation. In the first embodiment, the camera 20 captures the image 21 so as to include a plurality of markers M. When the control device 10 acquires a new image 21 from the camera 20, the control device 10 compares the new image 21 with an image 21 acquired before the new image 21. The former is referred to as "currently acquired image 21P" or simply as "image 21P", and the latter is referred to as "previously acquired image 21R" or simply as "image 21R". Then, the control device 10 determines whether or not the camera 20 is displaced based on the number of markers M whose positions have changed between the image 21P and the image 21R. Hereinafter, the marker M whose position has changed between the image 21P and the image 21R is referred to as a "position-changed marker". The control device 10 determines that the camera 20 has been displaced only when a predetermined number or more of position change markers are present, and does not determine that the camera 20 has been displaced when the number of position change markers is less than the predetermined number.

The reason why the camera 20 captures the image 21 including a plurality of marker M in the first embodiment is as follows. Even if the position of one marker M is changed between the image 21P and the image 21R, it cannot be determined that the positional deviation of the camera 20 is the cause. For example, the cause may be an event occurring in the marker M, such as the actual position of the marker M being shifted due to vibration or impact in the predetermined area AR, or the marker M being unable to be accurately recognized due to dirt or blurring of the marker M. Therefore, it is necessary to distinguish whether the presence of the position change marker is due to the positional deviation of the camera 20 or due to an event occurring in the marker M.

In the first embodiment, since the camera 20 captures an image of a range including a plurality of markers M, it is easy to distinguish whether the cause of the positional deviation of the marker M in the image 21 is the positional deviation of the camera 20 or an event occurring in the marker M. When the position of many marker M in the image 21 changes, there is a high possibility that the change is caused by the positional deviation of the camera 20. On the other hand, when the number of markers M whose positions have changed in the image 21 is small, there is a high possibility that the change is caused by an event occurring in the markers M. Therefore, the plurality of markers M are imaged by the camera 20, and it is determined that the positional deviation of the camera 20 has occurred only when the number of the position change markers is equal to or greater than the predetermined number. Thus, it is possible to increase the accuracy of the detection of the positional deviation of the camera 20.

2. Configuration Example

Figure 2:
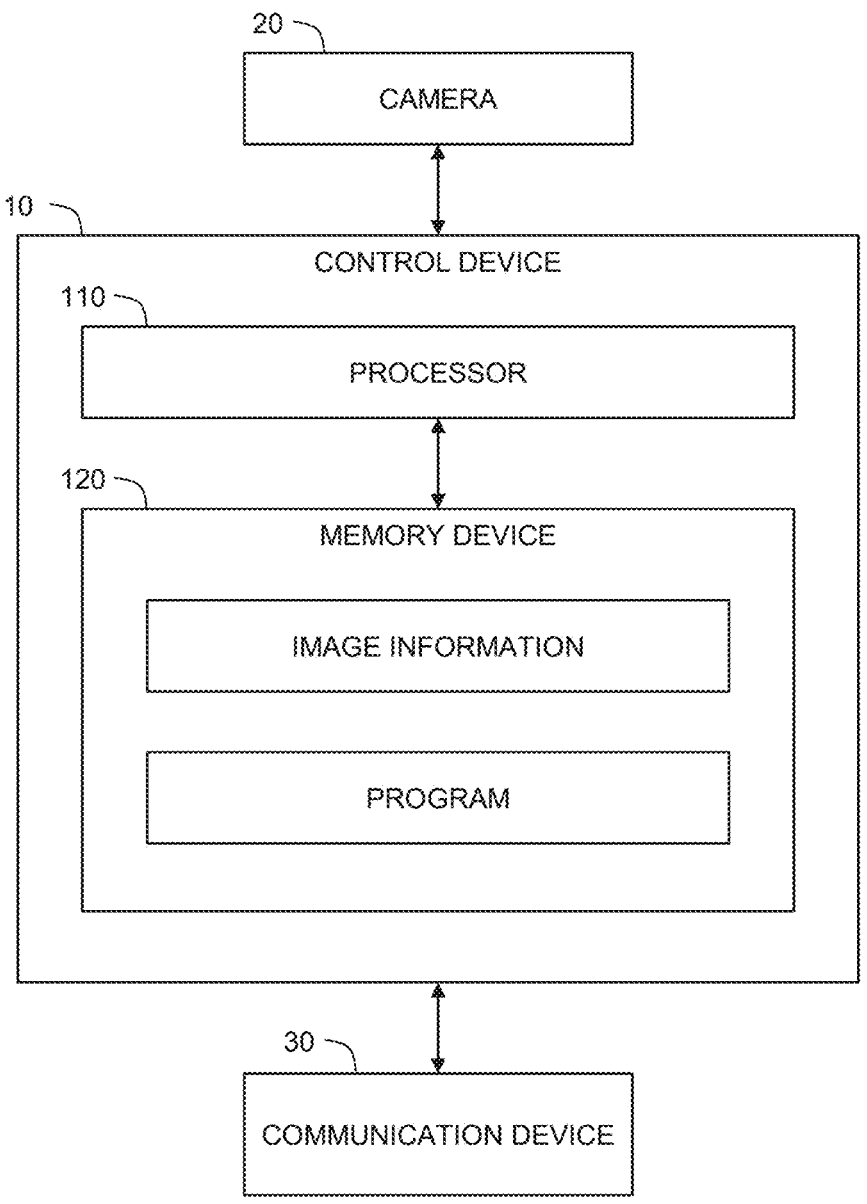
FIG. 2 is a diagram illustrating a configuration example of a moving body support system according to the first embodiment.

FIG. 2 is a block diagram illustrating a configuration example of the moving body support system 100 according to the first embodiment. The moving body support system 100 includes a control device 10, a camera 20, and a communication device 30.

The camera 20 is an infrastructure camera installed in an infrastructure. The camera 20 images the inside of a predetermined area AR so as to include a plurality of markers M. The image 21 obtained by imaging is acquired by the control device 10 and temporarily stored in the storage device 120 described later.

The communication device 30 communicates with the outside of the moving body support system 100. The connection destination of the communication device 30 includes at least the vehicle 200.

The control device 10 supports movement of the vehicle 200 in the predetermined area AR. The support of the movement of the vehicle 200 performed by the control device 10 includes position estimation of the vehicle 200 and control of the movement of the vehicle 200. The assistance of the movement of the vehicle 200 may also include transmitting the estimated position of the vehicle 200 to the vehicle 200. When or before estimating the position of the vehicle 200, the control device 10 determines the positional deviation of the camera 20.

The control device 10 estimates the position of the vehicle 200 based on at least the image 21. The position estimation of the vehicle 200 based on the image 21 can be performed by converting the position of the vehicle 200 in the image 21 into the position of the vehicle 200 in the real space. The control device 10 may perform the position estimation using the sensor information of the vehicle 200 together with the image 21. Examples of the sensor information include an image captured by an in-vehicle camera, acceleration information of the vehicle 200, and steering angle information. The sensor information is acquired from sensors mounted on the vehicle 200, such as an in-vehicle camera, a wheel speed sensor, a G sensor, a pinion angle sensor, and a yaw rate sensor. The control device 10 can acquire sensor information by communicating with the vehicle 200 via the communication device 30.

The control device 10 includes one or more processors 110 (hereinafter, simply referred to as processors 110) and one or more storage devices 120 (hereinafter, simply referred to as storage devices 120). The processor 110 executes various processes. For example, the processor 110 includes a central processing unit (CPU). The storage device 120 stores various kinds of information and various programs. Examples of the storage device 120 include a volatile memory, a nonvolatile memory, a hard disk drive (HDD), a solid state drive (SSD), and the like. The processor 110 can execute various processes including the determination of the positional deviation of the camera 20 by executing the program stored in the storage device 120. The various kinds of information stored in the storage device 120 include image information related to the image 21.

3. Processing Flow Example

Figure 3:
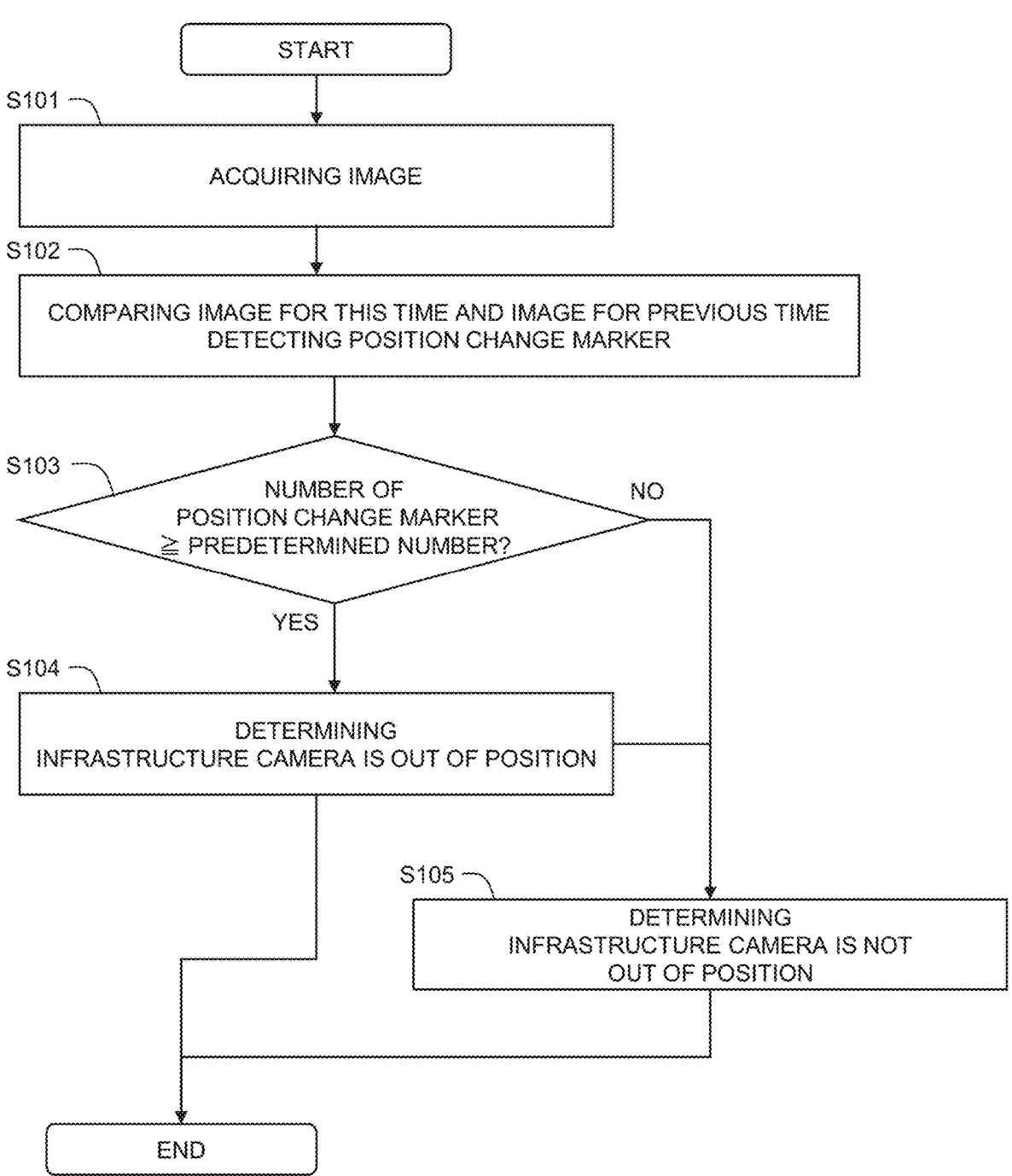
FIG. 3 is a flowchart illustrating an example of a processing flow according to the first embodiment.

FIG. 3 is a flowchart illustrating an example of a process performed by the moving body support system 100 (processor 110) to detect a positional deviation of the camera 20. The series of processes is performed before or while the moving body support system 100 supports the vehicle 200. The series of processes is realized by the processor 110 executing a program stored in the storage device 120.

In step S101, the moving body support system 100 acquires an image 21P newly captured by the camera 20. The acquired image 21P is temporarily stored in the storage device 120.

In step 102, the moving body support system 100 compares the image 21P acquired this time with the image 21R acquired last time from the camera 20 to detect a position-changed marker. The image 21R is the latest image among the images 21 acquired from the camera 20 and stored in the storage device 120 before the image 21P. The position-changed marker is a marker M whose position is changed in the image 21R among the plurality of markers M included in the image 21P.

In step S103, the moving body support system 100 determines whether or not the number of position change markers detected in step S103 is equal to or greater than a predetermined number. When the number of position-changed markers is equal to or greater than the predetermined number (Yes at Step S103), the process proceeds to Step S104. On the other hand, when there are less than the predetermined number of position change markers or when there are no position change markers (step S103; No), the processing proceeds to step S105. The predetermined number is a number serving as a reference for determining the positional deviation of the camera 20. The predetermined number is set in advance so as to be equal to or larger than 2 and equal to or smaller than the number of marker M included in the image 21. As the predetermined number, for example, the same number as the number of marker M included in the image 21 may be set. In this case, the positional deviation of the camera 20 is detected only when the position of every marker M included in the image 21 is changed.

In step S104, the moving body support system 100 determines that a positional deviation of the camera 20 has occurred.

In step S105, the moving body support system 100 determines that the positional deviation of the camera 20 has not occurred.

When the series of processes is completed and a determination result indicating that the positional deviation of the camera 20 has not occurred is obtained, the moving body support system 100 supports the movement of the vehicle 200 in the same manner as in the normal state. As the control performed by the moving body support system 100 on the vehicle 200 and the camera 20 when the determination result that the positional deviation of the camera 20 occurs is obtained, for example, the following control is assumed.

The first is to reduce the reliability of the position estimation of the vehicle 200 based on the image 21. That is, the moving body support system 100 preferentially uses a result acquired by another method rather than a detection result based on the image 21 to estimate the position of the vehicle 200. For example, in a case where there is another infrastructure camera that captures an image of the predetermined area AR, it is assumed that the position of the vehicle 200 is estimated by preferentially using an image acquired from another infrastructure camera in a range in which the other infrastructure camera can capture an image. Alternatively, the sensor information acquired from the vehicle 200 may be used to estimate the position of the vehicle 200 in preference to the image 21.

The second is to stop the control of the vehicle 200. For example, when the positional deviation of the camera 20 is large and it is difficult to estimate the position of the vehicle 200 from information other than the image 21, it is assumed that the control of the vehicle 200 is stopped.

The third is to perform calibration of the camera 20. The calibration is to correct the correspondence relationship between the position coordinates in the image 21 and the position coordinates in the real space, and is performed using the marker M. The moving body support system 100 corrects the position coordinates in the image 21 based on the position of each marker M in the image 21 and the position information of each marker M. By performing the calibration in this manner, it is possible to continuously estimate the position of the vehicle 200 using the image 21 and support the movement.

When calibration of the camera 20 is performed, it may be determined that calibration has failed. The failure of the calibration may occur, for example, when the positional deviation of the camera 20 exceeds a correctable magnitude or when the positional information cannot be acquired from at least a part of the marker M to be included in the image 21. The situation where the position information by the marker M cannot be acquired may occur, for example, in a case where the position deviation of the camera 20 is large and the marker M deviates from the angle of view of the camera 20, or in a case where the marker M cannot be read due to dirt. Therefore, the moving body support system 100 may first perform calibration of the camera 20 and stop the control of the vehicle 200 when it is determined that the calibration has failed. Alternatively, when it is determined that the calibration has failed, the administrator of the predetermined area AR may be notified and prompted to correct the position of the camera 20, clean the lens of the camera 20 or the marker M, or the like.

4. Second Embodiment

Also in the second embodiment, the configuration example and the point that it is determined that the camera 20 is displaced only when the number of position change markers is equal to or more than a predetermined number are common to those in the first embodiment. In the second embodiment, a "position change amount" is further acquired.

Figure 4:
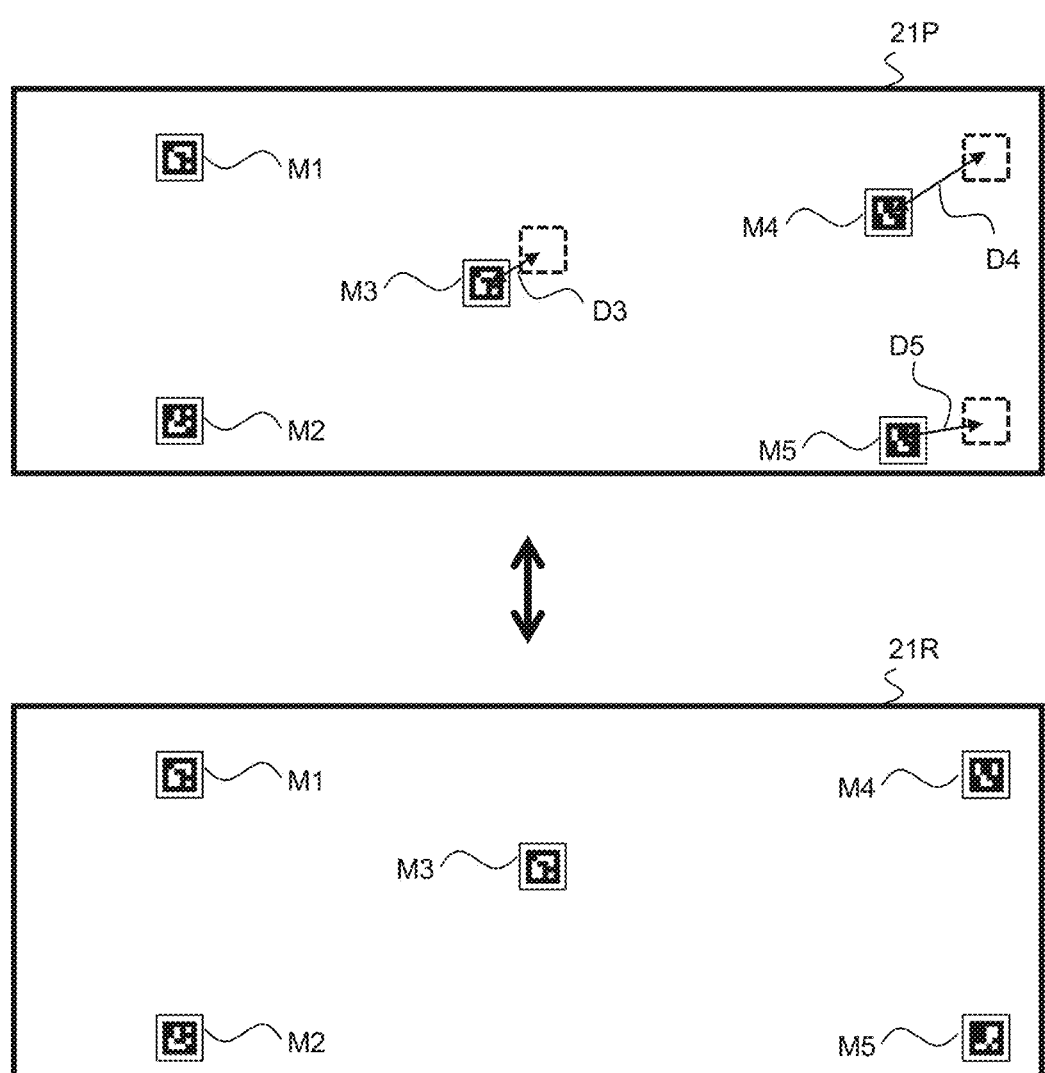
FIG. 4 is a diagram for explaining a position change amount.

FIG. 4 is a diagram for explaining a position change amount. The upper part is the image 21P acquired this time from the camera 20, and the lower part is the image 21R acquired last time from the camera 20. The image 21P and the image 21R include five markers M1, M2, M3, M4, and M5. There are three position changing markers M3, M4, and M5. In the image 21P, the positions of the markers 21R, M4, and M5 before the position changes, that is, in the image M3, are indicated by dotted lines. In addition, movement distances marker M3, M4, and M5 of the position changes D3, D4, and D5 as viewed in the image 21P are indicated by double-headed arrows.

The position change amount is an amount obtained by integrating the movement distances of the position change markers included in the image 21. For example, the position change amount may be an average value or a maximum value of the movement distances of all the position change markers included in the image 21.

Figure 5:
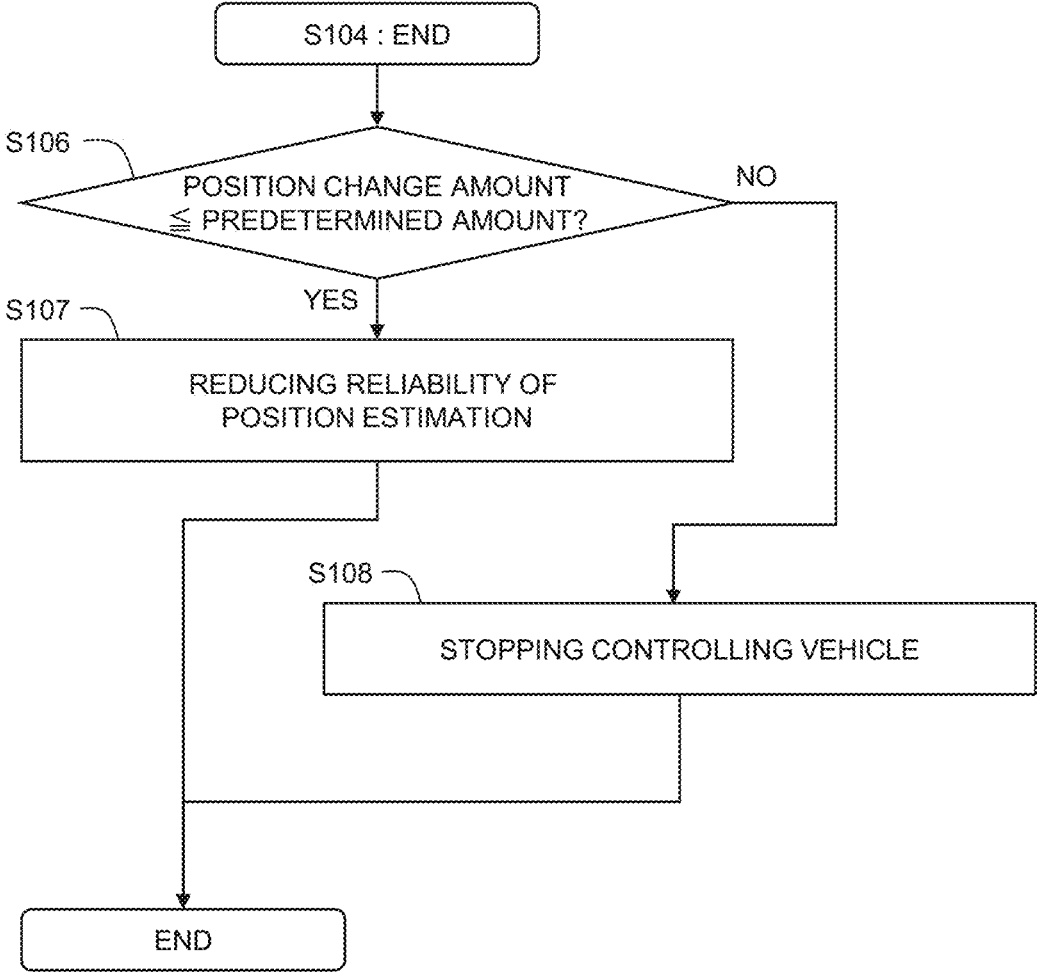
FIG. 5 is a flowchart illustrating an example of a processing flow according to a second embodiment.

In the second embodiment, moving body support system 100 changes a control content on vehicle 200 and camera 20 in accordance with the magnitude of the positional change amount when it is determined that positional deviation of camera 20 has occurred. FIG. 5 is a flowchart illustrating an example of processing according to the second embodiment. The processing up to step S104 is the same as that in the flowchart of FIG. 3, and thus is omitted.

After it is determined in step S104 that there is a positional deviation of the camera 20, the processing proceeds to step S106, and the moving body support system 100 determines whether or not the positional variation amount is equal to or less than a predetermined amount. When the position variation is equal to or less than the predetermined amount (step S106; Yes), the process proceeds to step S107. When the position variation amount is larger than the predetermined amount (step S106; No), the processing proceeds to step S108. The predetermined amount is an amount set in advance.

In step S107, the moving body support system 100 lowers the reliability of the position estimation based on the image 21.

In step S108, the moving body support system 100 stops the control of the car 200.

In the example of FIG. 5, when the position change amount is small, the control of the vehicle 200 is continued while only lowering the reliability of the position estimation based on the information other than the image 21. On the other hand, when the position change amount is large, the control of the vehicle 200 is stopped.

As described above, in the second embodiment, the control is changed according to the magnitude of the position change amount. Accordingly, it is possible to more appropriately control the vehicle 200 in accordance with the situation. The control selected in accordance with the magnitude of the position change amount is not limited to the control illustrated in FIG. 5. For example, the moving body support system 100 may perform calibration of the camera 20 when the position change amount is larger than a predetermined amount.

As described above, in the first and second embodiments, the camera 20 captures the image 21 so as to include the plurality of markers M. Then, the positional deviation of the marker 20 is detected based on the number of the position change markers. In this way, it is possible to improve the accuracy of detection of the positional deviation of the camera.

5. Third Embodiment

A third embodiment will be described. A configuration example of the moving body support system 100 is common to that of FIG. 2. However, this embodiment is different from the first and second embodiments in that the camera 20 includes a plurality of cameras. Further, the present embodiment is different from the first and second embodiments in that the marker M included in the image 21 captured by each camera 20 does not need to be plural.

Figure 6:
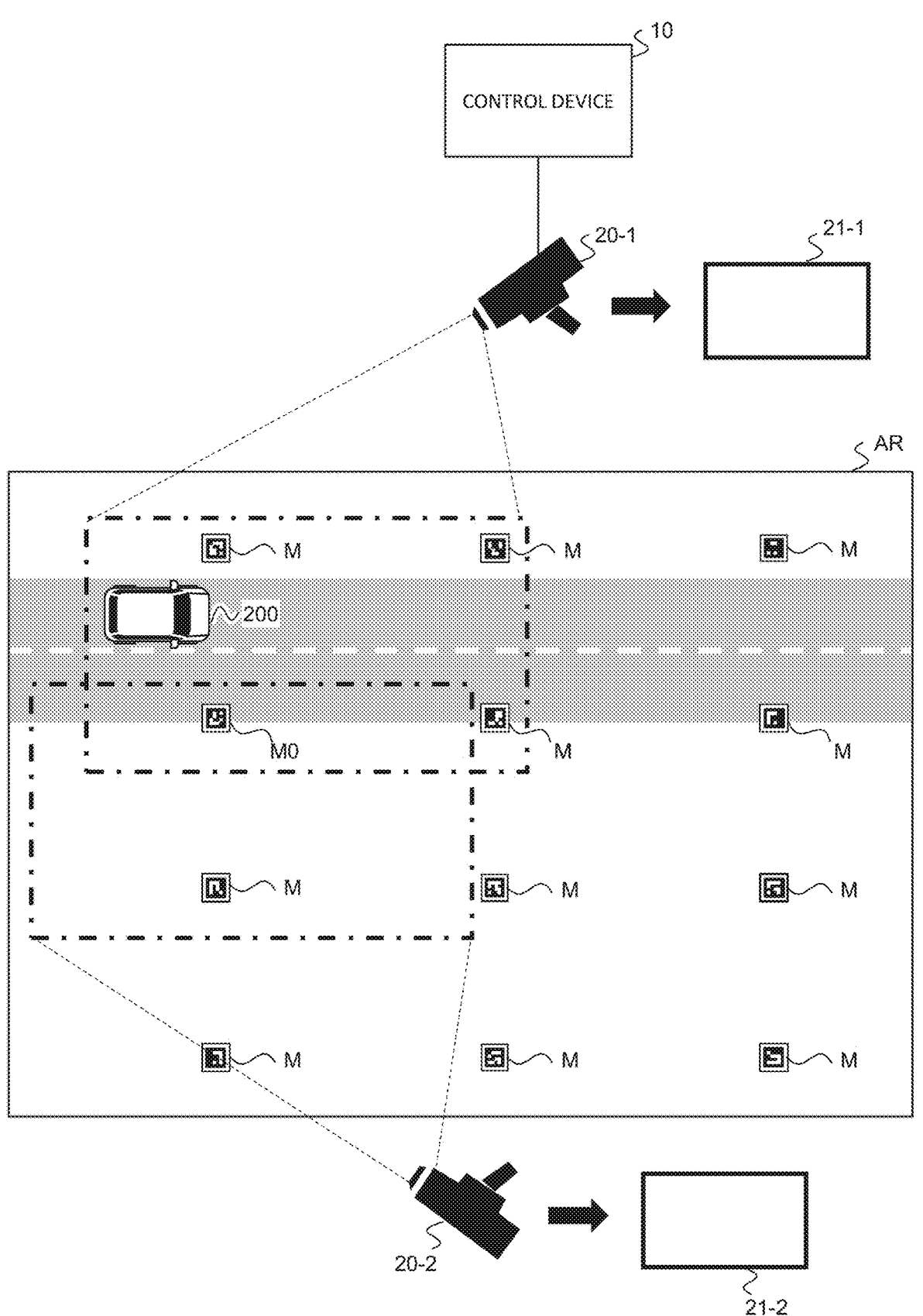
FIG. 6 is a diagram for explaining an outline of a third embodiment.

FIG. 6 illustrates a first infrastructure camera (first camera) 20-1 and a second infrastructure camera (second camera) 20-2 as examples of the plurality of cameras included in the camera 20. The first camera 20-1 and the second camera 20-2 are installed at different positions and capture the first image 21-1 and the second image 21-2 so as to include the same marker M0. Although FIG. 6 illustrates an example in which one marker M0 is provided, a plurality of markers M0 may be provided.

In the second embodiment, the positional deviation of the first camera 20-1 is detected as follows. First, the moving body support system 100 newly acquires the first image 21-1P captured by the first camera 20-1. The first image 21-1P acquired this time and the first image 21-1R acquired last time are compared with each other to detect a change in the position of the marker M0 in the first image. The previously acquired first image 21-1R is the latest image among the first images 21-1 acquired from the first camera 20-1 before the first image 21-1P and stored in the storage device 120.

In addition, the moving body support system 100 newly acquires a second image 21-2P captured by the second camera 20-2. The second image 21-2P acquired this time and the second image 21-2R acquired last time are compared with each other to detect a change in the position of the marker M0 in the second image 21-2. The second image 21-2R acquired last time is the latest image among the second images 21-2 acquired from the second camera 20-2 before the second image 21-2P and stored in the storage device 120.

When a change in the position of the marker M0 is detected from the first image 21-1 and a change in the position of the marker M0 is not detected from the second image 21-2, the moving body support system 100 determines that the first camera 20-1 is displaced. When a change in the position of the marker M0 is detected in both the first image 21-1 and the second image 21-2, the moving body support system 100 does not determine that the first camera 20-1 is displaced.

In the third embodiment, the positional deviation of the camera 20 is detected by using a plurality of cameras 20 instead of a plurality of marker M. As described in the first embodiment, when there is a marker M whose position is changed in the image 21, the cause of the change in the position of the marker M in the image 21 is considered to be either the positional deviation of the camera 20 or an event occurring in the marker M. If the position of the marker M0 changing in the first image 21-1 does not change in the second image 21-2, there is a high possibility that the cause of the change in the position of the marker M0 in the first image 21-1 is the positional deviation of the first camera 20-1. Conversely, if the position of the same marker M0 has changed in all of the plurality of images 21 captured by the plurality of cameras 20, there is a high possibility that the cause of the change in the position of the marker M0 is an event that has occurred in the marker M0. Therefore, by detecting the positional deviation of the camera 20 using the plurality of cameras 20 as described above, it is possible to improve the accuracy of the detection of the positional deviation.

Also in the third embodiment, the control by the moving body support system 100 may be changed in accordance with the position change amount. In this case, the positional variation amount can be set as a moving distance of the marker M0 in the first image 21-1. In addition, when there are a plurality of markers M0 and there are a plurality of markers M0 whose positions have changed in the first image 21-1, the position variation amount may be set as a mean value of the respective moving distances or may be set as a maximum value.

What is claimed is:

1. A system for supporting a movement of a moving body in a predetermined area, the system comprising one or more processors configured to:

acquire an image captured by an infrastructure camera such that the image includes a plurality of markers arranged in the predetermined area;

compare the image acquired this time and the image acquired previous time;

detect a position change marker among the plurality of markers whose position in the image acquired previous time changes from that in the image acquired this time;

determine that the infrastructure camera is out of position when it is detected that a number of the position change marker is equal to or more than a predetermined number;

determine that the infrastructure camera is not out of position when it is detected that the number of the position change marker is less than the predetermined number;

estimate a position of the moving body based on the image;

control the movement of the moving body based on the estimated position of the moving body; and when it is detected that the number of the position change marker is equal to or more than the predetermined number, change a control content of the movement of the moving body according to a position change amount of the position change marker.

2. The system according to claim 1, wherein the one or more processors are further configured to:

when it is detected that the number of the position change marker is equal to or more than the predetermined number, perform any one of:

reducing reliability of position estimation of the moving body based on the image;

stopping controlling the moving body; and calibrating the infrastructure camera.

3. A method for supporting a movement of a moving body in a predetermined area, the method comprising the steps of:

acquiring an image captured by an infrastructure camera such that the image includes a plurality of markers arranged in the predetermined area;

comparing the image acquired this time and the image acquired previous time;

detecting a position change marker among the plurality of markers whose position in the image acquired previous time changes from that in the image acquired this time;

determining that the infrastructure camera is out of position when it is detected that a number of the position change marker is equal to or more than a predetermined number;

determining that the infrastructure camera is not out of position when it is detected that the number of the position change marker is less than the predetermined number;

estimating a position of the moving body based on the image;

controlling the movement of the moving body based on the estimated position of the moving body; and when it is detected that the number of the position change marker is equal to or more than the predetermined number, changing a control content of the movement of the moving body according to a position change amount of the position change marker.

4. A system for supporting a movement of a moving body in a predetermined area, the system comprising one or more processors configured to:

acquire an image captured by infrastructure cameras installed in the predetermined area, wherein the infrastructure cameras include a first infrastructure camera and a second infrastructure camera that are configured to capture a same marker from different positions;

detect a first change of a position of the same marker by comparing a first image acquired this time with the first image acquired previous time, the first images are captured by the first infrastructure camera;

detect a second change of a position of the same marker by comparing a second image acquired this time with the second image acquired previous time, the second images are captured by the second infrastructure camera; and determine that the first infrastructure camera is out of position when the first change is detected whereas the second change is not detected.

5. The system according to claim 1, wherein the one or more processors are further configured to:

when it is detected that the number of the position change marker is equal to or more than the predetermined number, perform any one of:

reducing reliability of position estimation of the moving body based on the image; or stopping controlling the moving body.

6. The method according to claim 3, further comprising:

when it is detected that the number of the position change marker is equal to or more than the predetermined number, perform any one of:

reducing reliability of position estimation of the moving body based on the image; or stopping controlling the moving body.

7. The system according to claim 4, wherein the one or more processors are further configured to:

estimate a position of the moving body based on the first image;

control the movement of the moving body based on the estimated position of the moving body; and when it is detected that a number of the position change marker is equal to or more than a predetermined number, change a control content of the movement of the moving body according to a position change amount of the position change marker.

8. The system according to claim 7, wherein the one or more processors are further configured to:

when it is detected that the number of the position change marker is equal to or more than the predetermined number, perform any one of:

reducing reliability of position estimation of the moving body based on the image; or stopping controlling the moving body.

\* \* \* \* \*